US 8,336,502 B2

(12) United States Patent
Wilmert et al.

(10) Patent No.: US 8,336,502 B2
(45) Date of Patent: Dec. 25, 2012

(54) METHOD AND DEVICE FOR AUTOMATICALLY BRINGING A FLUID INTO CONTACT WITH THE TEATS OF AN ANIMAL

(75) Inventors: Wolfgang Schulze Wilmert, Gronau-Epe (DE); Reinhard Frenser, Rheda-Wiedenbrück (DE); Michael Austermann, Ascheberg (DE); Christelle Theis, Iserlohn (DE); Kevin L. Torgerson, Holmen, WI (US)

(73) Assignee: GEA Farm Technologies GmbH, Bönen (DE)

( * ) Notice: Subject to any disclaimer, the term of this patent is extended or adjusted under 35 U.S.C. 154(b) by 328 days.

(21) Appl. No.: 12/590,531

(22) Filed: Nov. 10, 2009

(65) Prior Publication Data
US 2010/0139574 A1    Jun. 10, 2010

Related U.S. Application Data

(60) Provisional application No. 61/198,839, filed on Nov. 10, 2008.

(51) Int. Cl.
*A01J 5/00* (2006.01)
(52) U.S. Cl. .................. 119/651; 119/670; 119/14.18
(58) Field of Classification Search ............. 119/651, 119/670, 14.47, 14.51, 14.53, 14.55, 14.38, 119/14.18
See application file for complete search history.

(56) References Cited

U.S. PATENT DOCUMENTS

| 1,365,665 A | 1/1921 | Davies |
| 2,532,088 A | 11/1950 | Cordis |
| 2,747,544 A | 5/1956 | Thomas |
| 3,014,455 A | 12/1961 | Olander |
| 3,461,845 A | 8/1969 | Peterson |
| 3,474,760 A | 10/1969 | Hoffman et al. |
| 3,482,547 A | 12/1969 | Maier |
| 3,648,696 A | 3/1972 | Keith |
| 3,696,790 A | 10/1972 | Albright |
| 3,713,423 A | 1/1973 | Sparr, Sr. |
| 3,973,520 A | 8/1976 | Flocchini |
| 4,034,714 A | 7/1977 | Umbaugh et al. |
| 4,149,489 A | 4/1979 | Umbaugh et al. |
| 4,168,677 A | 9/1979 | Brown |
| 4,175,514 A | 11/1979 | Souza et al. |

(Continued)

FOREIGN PATENT DOCUMENTS
AU        641229        9/1993
(Continued)

OTHER PUBLICATIONS

PCT/ISA/220, Notification of Transmittal of the International Search Report and the Written Opinion of the Int'l Searching Authority, or the Decl. received Mar. 6, 2010, 3pp.

(Continued)

*Primary Examiner* — Yvonne Abbott
(74) *Attorney, Agent, or Firm* — Smith Law Office (57) ABSTRACT

A dipping device for a milking system, especially for an automatic milking system designed as a milking robot with teat cups to be placed onto the teats of an animal to be milked, which is designed for contacting the teats of the animal with at least one fluid or several fluids, and the device has several dipping valve arrangements so that the dipping agent introduction to each teat of the animal can be controlled separately.

22 Claims, 4 Drawing Sheets

U.S. PATENT DOCUMENTS

| | | | |
|---|---|---|---|
| 4,222,346 A | 9/1980 | Reisgies | |
| 4,305,346 A | 12/1981 | Sparr, Sr. | |
| 4,332,215 A | 6/1982 | Larson | |
| 4,333,421 A | 6/1982 | Schluckbier | |
| 4,372,345 A | 2/1983 | Mehus | |
| 4,378,757 A | 4/1983 | Hamann | |
| 4,462,425 A | 7/1984 | Mehus | |
| 4,498,419 A | 2/1985 | Flocchini | |
| 4,516,530 A | 5/1985 | Reisgies et al. | |
| 4,572,105 A | 2/1986 | Chowdhury et al. | |
| 4,586,462 A | 5/1986 | Icking | |
| 4,903,639 A | 2/1990 | Kessel | |
| 4,924,809 A | 5/1990 | Verbrugge | |
| 4,936,254 A | 6/1990 | Marshall | |
| 5,052,341 A | 10/1991 | Woolford et al. | |
| 5,101,770 A | 4/1992 | Stevenson | |
| 5,161,482 A | 11/1992 | Griffin | |
| 5,167,201 A | 12/1992 | Peles | |
| 5,386,799 A | 2/1995 | Dietrich | |
| 5,390,627 A | 2/1995 | van der Berg et al. | |
| 5,572,947 A | 11/1996 | Larson et al. | |
| 5,673,650 A | 10/1997 | Mottram et al. | |
| 5,722,343 A | 3/1998 | Aurik | |
| 5,778,820 A | 7/1998 | van der Lely | |
| 5,850,845 A | 12/1998 | Pereira et al. | |
| 5,881,669 A | 3/1999 | van den Berg et al. | |
| 5,896,828 A | 4/1999 | Kronschnabel | |
| 5,909,716 A | 6/1999 | van der Lely | |
| 5,934,220 A | 8/1999 | Hall et al. | |
| 5,960,736 A | 10/1999 | Ludington | |
| 6,009,833 A | 1/2000 | van der Lely | |
| 6,089,242 A | 7/2000 | Buck | |
| 6,098,570 A | 8/2000 | Aurik et al. | |
| 6,234,110 B1 | 5/2001 | Xavier | |
| 6,244,215 B1 | 6/2001 | Oosterling | |
| 6,276,297 B1 | 8/2001 | van den Berg et al. | |
| 6,308,655 B1 | 10/2001 | Oosterling | |
| 6,318,299 B1 | 11/2001 | Birk | |
| 6,321,682 B1 | 11/2001 | Eriksson et al. | |
| 6,367,416 B1 | 4/2002 | van der Lely | |
| 6,371,046 B1 | 4/2002 | Petterson | |
| 6,435,132 B1 | 8/2002 | Milbrath et al. | |
| 6,550,420 B1 | 4/2003 | Bjork | |
| 6,584,930 B2 | 7/2003 | Buecker | |
| 6,591,784 B1 | 7/2003 | Eriksson | |
| 6,598,560 B1 | 7/2003 | van den Berg | |
| 6,626,130 B1 | 9/2003 | Eriksson | |
| 6,644,240 B1 | 11/2003 | Dietrich | |
| 6,755,153 B1 | 6/2004 | Chowdhury | |
| 6,935,270 B2 | 8/2005 | Wipperfurth et al. | |
| 6,997,136 B1 | 2/2006 | Coates | |
| 7,128,020 B2 | 10/2006 | Björk et al. | |
| 7,174,848 B2 | 2/2007 | Brown et al. | |
| 7,178,480 B2 | 2/2007 | Dahl et al. | |
| 7,263,948 B2 | 9/2007 | Ericsson et al. | |
| 7,281,493 B2 | 10/2007 | Dietrich | |
| 7,290,497 B2 | 11/2007 | Rottier et al. | |
| 7,350,478 B2 | 4/2008 | Fernandez | |
| 7,377,232 B2 * | 5/2008 | Holmgren et al. | 119/670 |
| 7,401,573 B2 | 7/2008 | Torgerson | |
| 7,412,943 B2 | 8/2008 | Ericsson et al. | |
| 7,536,975 B2 | 5/2009 | Denes et al. | |
| 7,578,260 B2 | 8/2009 | Shin | |
| 7,707,966 B2 | 5/2010 | Torgerson et al. | |
| 7,765,951 B2 | 8/2010 | Dietrich | |
| 7,793,614 B2 | 9/2010 | Ericsson et al. | |
| 7,926,449 B2 | 4/2011 | Stellnert et al. | |
| 7,963,249 B2 | 6/2011 | Duke | |
| 8,025,029 B2 | 9/2011 | Torgerson et al. | |
| 8,033,247 B2 * | 10/2011 | Torgerson et al. | 119/14.47 |
| 8,117,989 B2 | 2/2012 | Torgerson et al. | |
| 2002/0185071 A1 | 12/2002 | Guo | |
| 2004/0089242 A1 | 5/2004 | Verstege | |
| 2007/0070803 A1 | 3/2007 | Urquart | |
| 2007/0186860 A1 | 8/2007 | Dietrich | |
| 2007/0215053 A1 | 9/2007 | Duke | |
| 2007/0277737 A1 | 12/2007 | Maier et al. | |
| 2008/0022932 A1 | 1/2008 | Rottier et al. | |
| 2008/0202433 A1 | 8/2008 | Duke | |
| 2008/0276871 A1 | 11/2008 | Auburger et al. | |
| 2009/0050062 A1 | 2/2009 | Auburger et al. | |
| 2009/0064937 A1 | 3/2009 | Rottier et al. | |
| 2009/0151641 A1 | 6/2009 | Schulze Wartenhorst et al. | |
| 2009/0165724 A1 | 7/2009 | Mader et al. | |
| 2009/0320760 A1 | 12/2009 | Torgerson et al. | |
| 2010/0154900 A1 | 6/2010 | Torgerson et al. | |
| 2010/0236487 A1 | 9/2010 | Stellnert et al. | |
| 2010/0326360 A1 | 12/2010 | Duke et al. | |
| 2011/0220028 A1 | 9/2011 | Duke | |
| 2011/0220160 A1 | 9/2011 | Bosma | |

FOREIGN PATENT DOCUMENTS

| | | |
|---|---|---|
| DE | 1582939 | 7/1970 |
| DE | 2622794 | 12/1977 |
| DE | 3540058 | 5/1987 |
| DE | 4006785 | 9/1990 |
| DE | 10160161 | 6/2003 |
| EP | 0277396 | 8/1988 |
| EP | 0313109 | 4/1989 |
| EP | 0319523 | 6/1989 |
| EP | 0459817 | 12/1991 |
| EP | 0479397 | 4/1992 |
| EP | 0332235 | 12/1992 |
| EP | 0527509 | 2/1993 |
| EP | 0630557 | 12/1994 |
| EP | 0801893 | 10/1997 |
| EP | 0543463 | 3/2001 |
| EP | 1089615 | 3/2003 |
| EP | 0945057 | 7/2003 |
| EP | 1328148 | 3/2005 |
| EP | 1 520 469 A1 | 4/2005 |
| EP | 1520469 | 4/2005 |
| EP | 1543720 | 6/2005 |
| EP | 1737291 | 11/2005 |
| EP | 1790217 | 5/2007 |
| EP | 1795069 | 6/2007 |
| EP | 1679956 | 12/2008 |
| EP | 2113169 | 11/2009 |
| EP | 1933616 | 1/2011 |
| EP | 2277373 | 1/2011 |
| GB | 918766 | 2/1963 |
| JP | 2002354958 | 12/2002 |
| NL | 1016237 | 3/2002 |
| NL | 1021950 C | 5/2004 |
| WO | WO98/28969 | 7/1998 |
| WO | WO99/46978 | 9/1999 |
| WO | WO99/66787 | 12/1999 |
| WO | WO01/17337 | 3/2001 |
| WO | WO01/17338 | 3/2001 |
| WO | WO02/07506 | 1/2002 |
| WO | WO02/23976 | 3/2002 |
| WO | WO03/030630 | 4/2003 |
| WO | WO03/098998 | 12/2003 |
| WO | WO2004/032608 | 4/2004 |
| WO | WO2005/043986 | 5/2005 |
| WO | WO2005/072516 | 8/2005 |
| WO | WO2005/102035 | 11/2005 |
| WO | WO2006/029797 | 3/2006 |
| WO | WO 2006/029797 A1 | 3/2006 |
| WO | WO2006/117019 | 11/2006 |
| WO | WO2006/135917 | 12/2006 |
| WO | WO2007/031783 | 3/2007 |
| WO | WO2007/129884 | 11/2007 |
| WO | WO2007/129888 | 11/2007 |
| WO | WO2008/102567 | 8/2008 |
| WO | WO2008/138862 | 11/2008 |
| WO | WO2009/077607 | 6/2009 |
| WO | WO2009/158000 | 12/2009 |

OTHER PUBLICATIONS

PCT/ISA/210, International Search Report received Mar. 6, 2010, 4pp.
PCT/ISA/237, Written Opinion of the International Search Authority received Mar. 6, 2010, 5pp.
English language Translated Description and Claims of WO 2006/029797A1, European Patent Office's esp@cenet.com database, 4pp.

Akam, D.N., The Development of Equipment for the Mechanization of Manual Operations . . . 17th Annual Mtg. Nat'l Mastitis Counsel, Inc., pp. 417-426, Feb. 21-23, 1978.

Grindal et al., Automatic application of teat disinfectant through the milking machine cluster, Journal of Dairy Research, 56:579-585 (1989), 7pp.

International Search Report and Written Opinion from PCT/US2011/00322, dated Dec. 20, 2011.

Letter to Alex Ferguson from Jeffry W. Smith dated Dec. 22, 2006, 2pp.

Office Action for U.S. Appl. No. 10/576,744 dated Jun. 3, 2010, 8pp.

Office Action for U.S. Appl. No. 11/652,372 dated Feb. 11, 2008, 14pp.

Office Action for U.S. Appl. No. 11/662,454 dated Aug. 16, 2010, 20pp.

Office Action for U.S. Appl. No. 11/904,769 dated Feb. 20, 2008, 9pp.

Preliminary Amendment for U.S. Appl. No. 10/576,744 filed Apr. 21, 2006, 16pp.

Preliminary Amendment for U.S. Appl. No. 10/576,744 filed Aug. 7, 2008, 10pp.

Shearn et al., "Reduction of bacterial contamination of teatcup liners by an entrained wash system," Institute for Animal Health, Veterinary Record (1994),134,450, 1p.

Thompson, et al. The End-Of-Milking Sequence and its Mechanization, 1976 Winter Mtg., Dec. 14-17, 1976, Animal Physiology and Genetics Inst., Beltsville, MD, 15pp.

U.S. Appl. No. 60/578,997, filed Jun. 12, 2004, Kevin L. Torgerson.

PCT/US09/03770—IPRP and Written Opinion rec'd Jan. 13, 2011, and ISR rec'd Oct. 7, 2009.

PCT/US06/023075—ISR & Written Opinion rec'd Oct. 16, 2006.

PCT/GB04/004343—Written Opinion of ISA & IPRP rec'd Feb. 3, 2005, 5pp.

PCT/US09/006026—IPRP, Written Opinion of ISA & ISR rec'd Mar. 6, 2010, 9pp.

Neijenhuis et al. Health of dairy cows milked by an automatic milking system, Oct. 2003, 23 pages.

* cited by examiner

METHOD AND DEVICE FOR AUTOMATICALLY BRINGING A FLUID INTO CONTACT WITH THE TEATS OF AN ANIMAL

This application claims the benefit of Provisional Application No. 61/198,839 filed Nov. 10, 2008, the disclosure of which is incorporated herein by reference.

FIELD AND BACKGROUND OF THE INVENTION

The invention concerns a device and a method for automated dipping of dairy animals teats.

It is known that milking systems can be equipped with a device for bringing a teat of an animal into contact with at least one or more fluids, briefly referred to below as "dipping device". The fluids are applied by dipping devices to the teats of a milk-producing animal after milking. The fluids are typically disinfectants that are sometimes referred to as dipping agents. Some dipping devices have spray nozzles located on the floor or they are arranged on a robot arm that carries a milking machine. These installations have a relatively high dipping agent consumption, since the dipping agent can be sprayed only in a relatively undefined manner into the area of the teats of the milk-producing animal.

A significant improvement in comparison to the above state of the art is achieved by the generic U.S. Pat. No. 7,401,573 B2. According to the teaching of this patent, the dipping agent is passed into a liner of a teat cup after milking and before removal of the milking machine from the teats, to wet the teats with the dipping agent. After the removal of the milking machine, the teat cups and liners are rinsed with a cleaning agent (which can also be water) to remove any residues of the dipping agent from the teat cups before the next milking process begins.

Regarding an especially advantageous construction of the teat cups, which have at least one or several integrated line(s) for a fluid, such as a dipping agent designed as a disinfectant and/or the cleaning agent, see WO 2006/029797.

SUMMARY OF THE INVENTION

The generic method and the generic device described above are optimized by the invention, so that they will be even better suited for use in milking robots. A dipping device in accordance with the invention has two or more dipping valve arrangements, so that the introduction of the dipping agent to each teat of the animal can be controlled separately.

A special advantage of the invention lies in the fact that the dipping process can be carried out for each teat right before removal of a particular teat cup, even when the teat cups are removed at different times. The invention is particularly advantageous when the milking system, for example a milking robot, is designed to remove the teat cups from the teats of an animal at different times when the particular milking process on the teat is completed. Such a dipping, for example, "quarter individual" dipping in the case of a cow, was not possible according to the state of the art since the dipping agent could be introduced only simultaneously to all the teats.

Below the invention will be explained in more detail with the aid of practical examples with reference to the drawings. The following are shown:

DETAILED DESCRIPTION OF THE PREFERRED EMBODIMENTS

Figure 1:
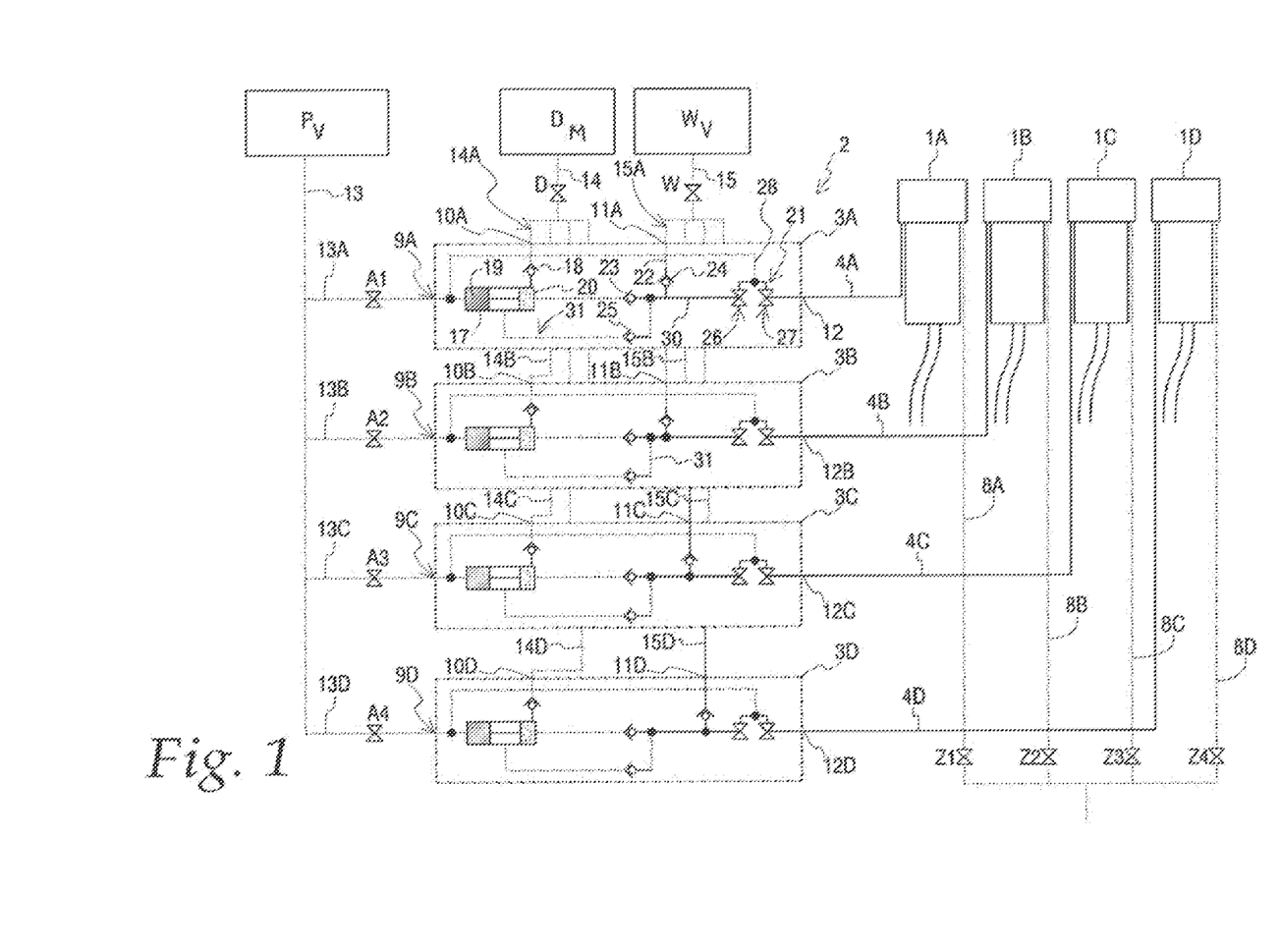
FIG. 1 is a schematic representation of an embodiment of a dipping device according to the invention connected to the teat cups of a milking system.

FIG. 1 shows a schematic representation of a dipping device for bringing of a teat of an animal into contact with at least one fluid—or with several fluids—briefly referred to below as "dipping device." Preferably, the device is automated as described below.

An example of the construction of the teat cups is provided below in reference to FIG. 4, and in WO 2006/029797 and U.S. patent application Ser. No. 12/215,706, which are incorporated herein by reference. The dipping device 2 is suitable for use as a component part of a milking system, particularly of an automated milking system designed as a milking robot that automatically places, without manual intervention by an operator, teat cups 1a to 1d of an otherwise not shown milking machine, onto the teats of an animal to be milked, to milk a dairy animal, and to remove the milking cups. Such milking robots are known in many different embodiments and are therefore not shown here, except for the teat cups 1 and the dipping device 2 that is connected to the teat cups.

The milking system has a number of teat cups 1a to 1d corresponding to the number of teats of the animal to be milked with the milking system, and among other things, these are also connected to the dipping device 2.

The dipping device 2 provides controlled introduction of one or more fluids such as a disinfectant (called dipping agent below) and/or a cleaning agent, such as water. The fluids are stored and pumped from a dipping agent reservoir $D_M$ and/or from a water supply $W_V$ into the teat cups 1a to 1d.

The dipping device 2 is designed in such a way that it is possible to control fluid flow between the dipping agent supply $D_M$ and/or the water supply $W_V$ through lines 4a to 4d to each of the teat cups 1a to 1d, independently of the fluid flow to the other teat cups 1.

Preferably, the introduction of the fluid is provided to each teat cup 1a to 1d, after the completion of the milking process on each teat. This is particularly advantageous in the case of a milking robot, when the teat cups 1a to 1d are not applied and/or removed simultaneously, but are provided in time so that dipping follows the end of milking. It is also possible to introduce the fluid to the teat cups 1a to 1d simultaneously when dipping valve arrangements 3a to 3d are started at the same time. Preferably, the dipping device 2 includes the dipping valve arrangement 3 between the dipping agent reservoir $D_M$ and each of the teat cups 1a to 1d or for pairs of teat cups 1a to 1d.

Also preferably, the number of dipping valve arrangements 3a to 3d corresponds to the number of teats of the animal to be milked and the teat cups 1a to 1d, so that the introduction of fluid or fluids to each of the teats is controlled separately.

In the direction of flow of the fluid to be introduced, one of the dipping valve arrangements 3a to 3d is connected before each teat cup 1a to 1d, so that one of the connections from an internal intermediate reservoir (see below) in one of the lines 4a to 4d can be released into or locked out of one of the teat cups 1a to 1d.

The dipping valve arrangements 3a to 3d are preferably not electrical and can be controlled with compressed air. Each dipping valve arrangement 3a to 3d is connected through a respective line 4a to 4d and a teat cup 1a to 1d. Each dipping valve arrangements 3a to 3d can also be attached directly to a teat cup 1a to 1d. The dipping valve arrangements 3a to 3d preferably release or prevent the introduction of the dipping agent into the lines 4a to 4d and the teat cups 1a to 1d. In addition, the dipping valve arrangements preferably perform other functions as well. The dipping valve arrangements 3a to 3d preferably perform cleaning functions and/or safety functions that meaningfully complement the actual dipping process and/or contribute to increasing the safety of the dipping process.

For this purpose the dipping valve arrangements 3a to 3d preferably control fluid flow to the teat cups 1a to 1d to prevent an unintended introduction of dipping agent into a teat cup 1a to 1d at a time that was not intended so as to comply with strict safety requirements.

Figure 4:
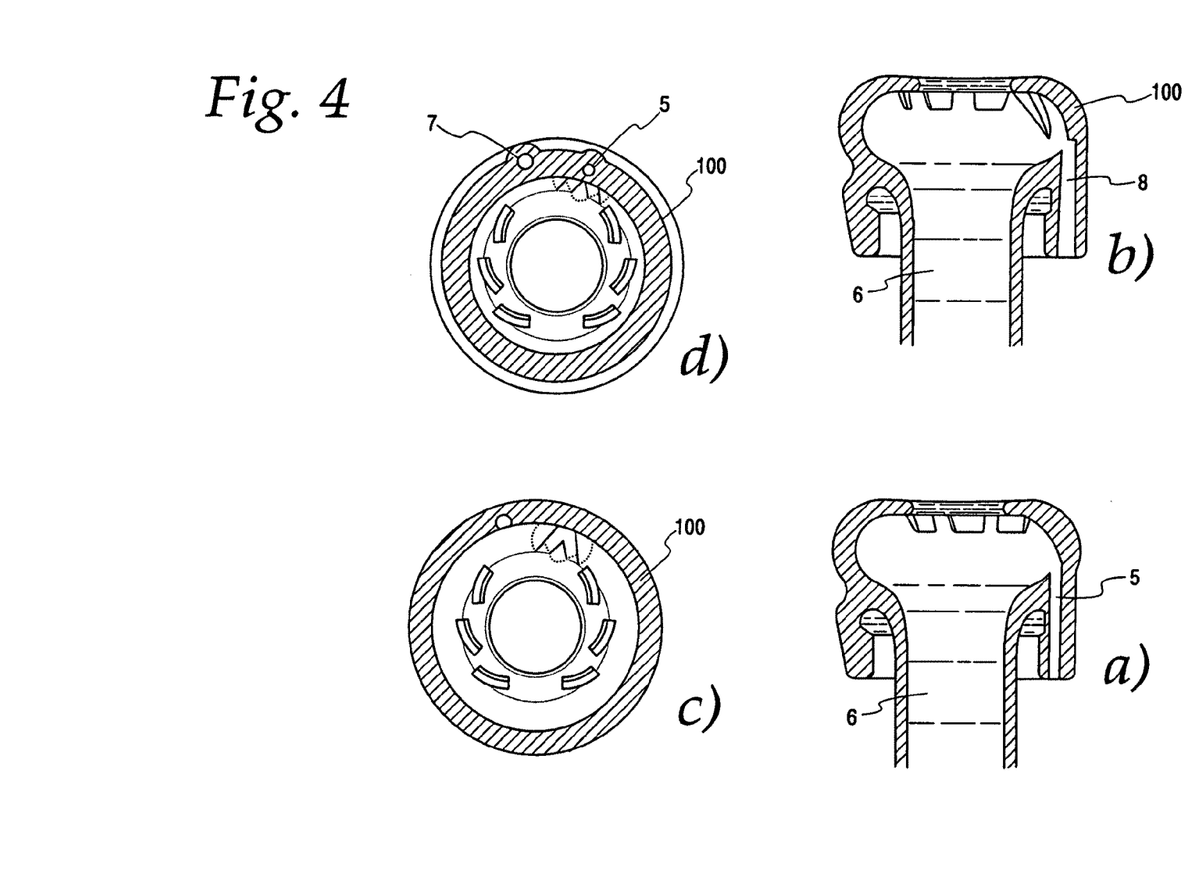
FIGS. 4a-d are various sections through a partial region of a teat liner for a milking device equipped with a dipping device according to the invention.

Each of the teat cups 1a to 1d have a teat liner 100, as illustrated in FIG. 4. The teat liners 100 are preferably designed so that one can clean, milk and/or dip the teat with a single teat liner.

Preferably, each teat liner 100, and again especially preferably the teat liner heads have a duct 5 integrated into their wall through which fluid flows from respective dipping valve arrangements 3a to 3d and lines 4a to 4d into the inside of the teat cup or into the inside of the teat liner.

The discharge of fluid, such as water or milk, from the teat cups or from the inside chamber of the corresponding teat liner is performed, on the other hand, through a liner barrel 6 and through the milk lines downstream. The discharge of the dipping agent or cleaning agent is done preferably into a separate line (not shown here).

The teat cups 1a to 1d or preferably the liners 100 each preferably have another duct 7 integrated into the teat cups 1a to 1d, to guide another fluid, such as a cleaning agent and/or water into the inside of the teat cup or into the inner chamber of the teat liner to rinse around or through the inside of the teat cup and the teats with this additional fluid. In the illustrated embodiment, the ducts 5 and 7 are spaced apart from one another on the periphery of the liner 100. The advantages of this known arrangement follow from WO 2006/029797, which is incorporated herein by reference and can also be used in the present invention.

The ducts 7 are connected to inlet lines 8a to 8d, in which shut-off valves Z1 to Z4 are connected, so that the inlet lines 8a to 8d to the teat cups can also be controlled separately or opened and closed separately from one another. These inlet lines 8 can be connected, for example, to a cleaning agent supply (not shown here).

Alternatively, a single duct in a teat liner can be for the introduction of the dipping agent and for the introduction of the other fluid, whereby then the other fluid is introduced into the duct 5 before the teat cups/teat liners 100 (not shown here).

In the present invention, the dipping agent valves 3a to 3d all have the same construction, and are shown as dashed-line boxes and each of which provides for the dipping of one of the teats based on its functionality. The dipping valve arrangements 3 preferably can open and close to alternately permit or block flow of fluids through each one of the inlet lines 4a to 4d to the milking cups.

Figure 2:
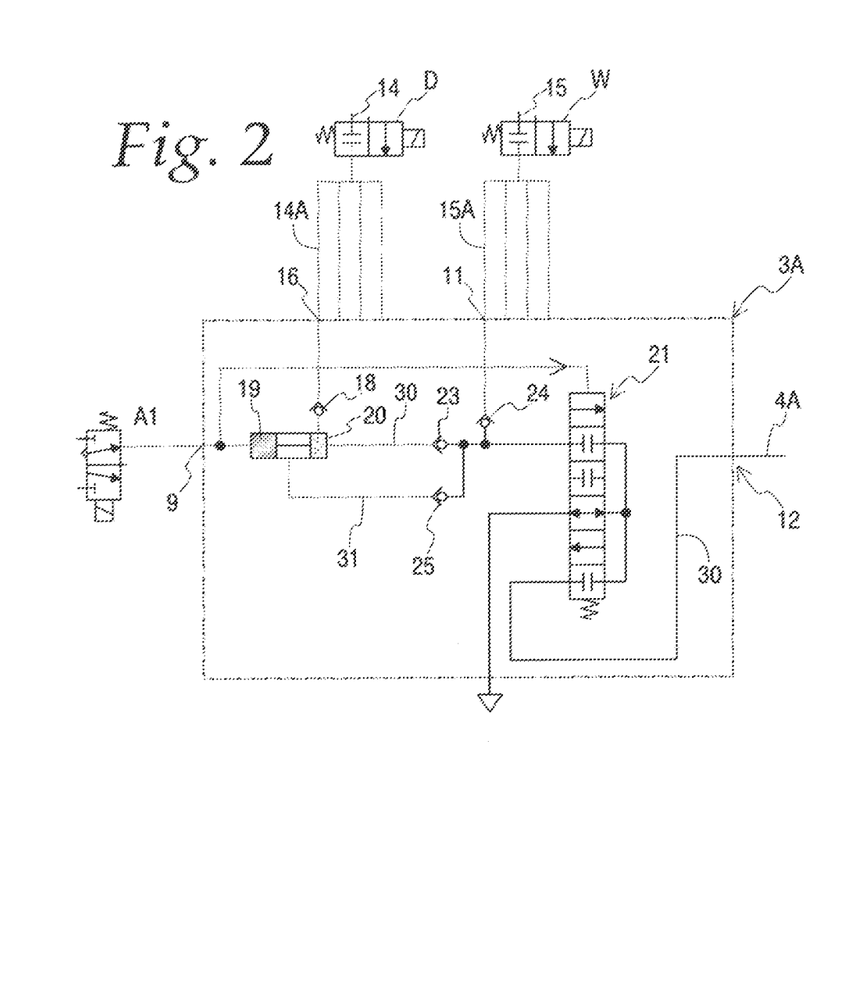
FIG. 2 is a circuit diagram provided with symbols for switching devices of a dipping valve arrangement for a dipping device according to the invention.

According to FIGS. 1 and 2, the dipping valve arrangements 3 each have three inlets 9a and 9d, 10a and 10d, and 11a and 11d for controlling air, the dipping agent and another fluid such as water, and one discharge 12 for used fluids. In the illustrated embodiment, each of the inlets 9a and 9d of the dipping valve arrangements 3a and 3d is connected to a respective branch line 13a, 13b, 13c, or 13d to the compressed air supply $P_V$ through a branched line 13. In each of the branch lines 13a, 13b, 13c, 13d, a shut-off valve A1 to A4 is connected before each of the inlets 9a and 9d.

Moreover, the second inlets 10a to 10d of the dipping valve arrangements 3a to 3d are each connected to the dipping agent reservoir $D_M$ through an inlet 14 branching into four branch lines 14a to 14d in which a single shut-off valve D is connected before the region of the branching. Multiple shut-off valves can also be used.

Finally, the third inlets 11a to 11d of the dipping valve arrangements 3a to 3d are connected to the cleaning agent/water supply $W_V$, for example a container or pump, through an inlet line 15 branching into four branch lines 15a to 15d, in which a shut-off valve W is connected before the region of the branching. Again, multiple shut-off valves can be used.

The discharges 12a to 12d of the dipping valve arrangements 3a to 3d are each connected to one of the inlet lines 4a to 4d for each of the teat cups 1a to 1d.

Each of the dipping valve arrangements 3a to 3d has a cylinder 17 which is preferably a double-action cylinder with a two-sided piston. A cylinder chamber or one side 19 of this cylinder 17 is connected in each case to a corresponding inlet 9a to 9d for the introduction of compressed air. On the other hand, the other cylinder chamber 20 of the cylinder 17 is connected in each case to a cylinder inlet, preferably through a check valve 18 that prevents backflow through the inlet 10a to 10d. An internal line 30 has a check valve 23 to an inlet of the safety valve arrangement 21 that discharges to the teat cups 1a to 1d.

It is possible to fill the chambers 19 and 20 of the cylinder 17 alternately with compressed air or dipping agent (or preferably alternatively with cleaning agent), whereby compressed air empties the cylinder chamber 20 of dipping agent and forces the dipping agent through a line 30 which leads to a respective safety valve arrangement 21, into the particular inlet line 4a to 4d to the teat cups 1a to 1d, and through the particular inlet line 4 into a respective teat cup 1a to 1d. A check valve 23 is preferably used in line 30 between the cylinder chamber 20 and the safety valve arrangement 21.

An inner inlet line 22 from inlet 11a to 11d also opens into line 30 to which the cleaning agent/water supply $W_V$ is connected. Again, a check valve 24 is connected that allows fluid to flow again in the direction from inlet 11a to 11d to line 30.

Figure 3A:
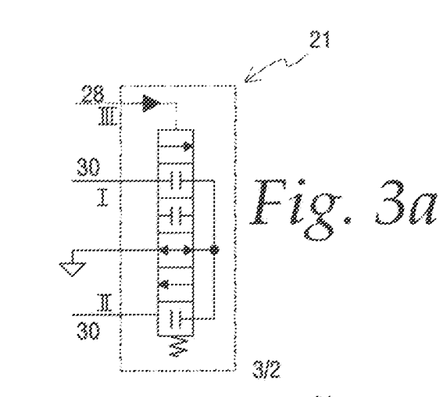
FIG. 3a, b are circuit-diagram-like representations of two different safety valve arrangements for dipping valve arrangements of the dipping devices according to the invention.
Figure 3B:
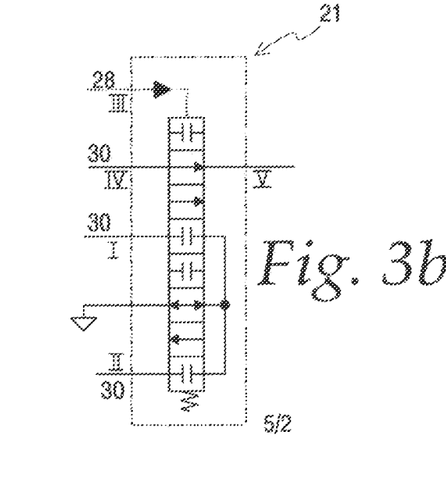

The safety valve arrangement 21 can be designed in different ways. Two possible arrangements are shown in FIGS. 3a and 3b, whereby the safety valve arrangement corresponds to that of the example of dipping valve 3a of FIG. 2. Accordingly, the safety valve arrangement as a 3/2-way valve is provided with three external connections I (inlet line 30 from cylinder chamber 20 of cylinder 17), II (discharge line 30 to the inlet line 4a to the teat cup 1a) and III (control inlet 28 for controlling with compressed air).

In one of the positions, the line 30 for the dipping or cleaning agent to the particular inlet line 4 to the teat cup 1a to 1d is released and in the other position the line 30 is sealed twice to ensure with high reliability that no fluid can flow to the particular teat cup 1a, b, c or d at a time that is not intended.

The safety valve arrangement 21 can also be realized in another way, such as according to FIG. 3b, for example, with the aid of a 5/2-way valve, which has an additional lock-out possibility for a fluid line, through the safety valve arrangement of FIG. 2 at inlets IV and V, which can be used for securing or resecuring a line of the internal lines of the dipping agent valve.

On the other hand, the valves A1, A2, A3 or A4, D and W that are connected before the dipping valve arrangement 3a can be controlled or switched electrically, which is done preferably with the aid of a superordinate control device of the milking system that controls the milking process (the control device is not shown here).

In addition, a bypass line 31 goes from cylinder 17 to the line 30, which again has a check valve 25 connected in it.

In FIG. 1, the safety valve arrangement is shown with two check valves 26 and 27 disposed in compressed air line 13a to 13d and connected in series, between a control inlet 28 and the inlet 9. The check valves 26 and 27 are controlled with compressed air by actuating valves A1 to A4, respectively.

The safety valve arrangement 21 is designed to be switched either into a closed position or an open position, in which the dipping agent or water is passed from the dipping agent supply, the cylinder chamber 20 of cylinder 17, the particular inlet line 4a to 4d, and into the corresponding teat cups 1a to 1d. This can be done to either wet a particular teat with dipping agent, or to rinse or clean the inlet lines 4, the feed lines 5, and the teat liners 100.

It is also possible to move the safety valve arrangement 21 into a closed position in which no dipping agent or water can flow through the line 4. Through the selected circuit, water and dipping agent can be introduced individually to each teat cup independently of one another.

The control of valves D, W, A1 to A4 as well as Z1 to Z4 is preferably done electrically with the aid of a correspondingly-programmed control computer. On the other hand, the actual dipping device with the dipping valve arrangement 3 is preferably designed as a system that is controlled purely with fluid, the control of which is done indirectly through the control of valves A1 to A4, D, W. Milk is obtained during a milking procedure. Alternative I of the first milking/cleaning places the four teat cups 1 on an animal, and then water is introduced to the four teat cup through lines 8a to 8d and their teat liner heads 100 for each teat.

In a milking robot, the storage container for the cleaning water (which can also be container $W_V$) is preferably arranged higher than the teat cups 1a to 1d so that the introduction of cleaning water to the teat cups 1 is supported by gravity and the milking vacuum applied to the teats.

In the teat cups (preferably designed as two-chamber teat cups 1a to 1d) during the milking, a vacuum is produced in the teat liner inner chamber and an alternating vacuum is produced in the teat cup intermediate chamber (pulsation). The teat cup liner is thereby opened and closed with respect to the path from the milking line to the teat opening. Accordingly, the teat liner 100 is constantly in motion, which promotes the cleaning of the teats.

Thus, during milking, a mixture of cleaning water and milk is obtained which cannot be used (referred to as "first milk"). This mixture is separated into a special container in a manner that is not shown here.

Preferably, for this purpose, two separate ducts are produced at the teat liner head. The duct 7 is used for cleaning the teats during the obtaining of the first milk and the duct 5 is used for dipping the teats after the milking.

Alternative II of the first milking/cleaning, in contrast to alternative I, uses water under pressure from the dipping installation, in the following manner: first, valve W is opened to allow water under pressure to enter into the line system of the dipping valve arrangement 3. Then valves A1 to A4 are opened to feed compressed air at inlets 9 into the four corresponding dipping valve arrangements 3.

In this way, the four corresponding safety valve arrangements 21—also called block-bleed-block devices—are opened so that water under pressure is allowed to enter the particular dipping valve arrangement 3 and is first mixed with the compressed air from the dipping valve arrangement 3, and the mixture arrives at the corresponding teat liner head. The mixing with the compressed air is provided by the cylinder 17 arranged in the particular dipping valve arrangement 3. The cylinder 17 is on the right so that the compressed air can leave the cylinder 17 through bypass line 31 to be mixed with the water under pressure located in the valve. Thus, alternative II has only one line 5 in the teat cup, which ensures the introduction of the cleaning agent to the teat liner head.

Alternative III of first milking/cleaning follows the black and dotted line for the cleaning water between valve 27 of the safety arrangement or between block 27 and the teat liner head 100 is connected to dipping duct 5 so that here too only one agent line is needed, which simplifies the connection to the teat liner head.

The dipping device is designed so that it can be combined with all three variations of the first milking and optionally also with other variations.

Regarding dipping after milking, the milking process is ended by turning off the milking vacuum in the teat liner inner chamber and turning off the pulsation cycles within the teat cup intermediate chamber or the teat cup pulsation chamber.

Since the milking vacuum decreases slowly, each individual teat cup 1a to 1d remains attached to a corresponding teat for a period of time. The vacuum producing the attachment decreases by itself due to the fact that the contact between the teat liner and the teat is not tight. When the vacuum producing the attachment has decreased sufficiently, the teat liners and cups fall off by themselves. The falling off of the teat cups can be promoted by increasing the running time of the pulsator beyond the time point when the milking vacuum is turned off. It is also possible that the teat cups 1a to 1d can be pulled away from the teats when the teat liners stick to the teat due to an unfavorable shape of the teats. Before the teat cup is taken off or falls off individually from the teats, the treatment of the teats with the aid of the dipping valve arrangement 3 described above occurs as follows:

With the aid of the double piston 17, the dipping agent will arrive at the teat liner head 100 because the double piston 17 is previously filled with dipping agent, namely according to the scheme shown on the right side of the double piston in the cylinder chamber 20 (see FIG. 1). In this position, the bypass line 31 of the double piston 17 is closed.

The dipping of the first teat is initiated by opening the first compressed air valve A1, and the double piston 17 is thereby shifted to the right, so that the dipping agent plug is pushed out from the cylinder chamber 20, whereupon the check valve 23 opens.

At the same time, the compressed air introduced through the compressed air valve A1 causes the block-bleed-block device or the safety valve device 21 to open correspondingly, so that the dipping agent plug can arrive at the teat liner head. When the entering compressed air has pushed the double piston 17 to the right to such an extent that the compressed air can leave through the bypass line that has become free, the lines 30 and 4 are emptied with the aid of the compressed air that passes through bypass line 31.

Simultaneously, the double piston 17 moves again to the left due to the dipping agent pressure, so that the dipping valve arrangement can be loaded with a new dipping agent plug. Preferably, the dipping agent valve 3 is filled with dipping agent again only before or during the next milking process after the cleaning of the dipping agent valves 3a to 3d. Then the interaction between the entering compressed air and the dipping agent plug begins again. Preferably, all of the safety valve arrangements 21 are filled with dipping agent simultaneously, but are emptied in succession (FIG. 5).

The dipping agent valve 3a-3d is preferably constructed in such a way that the complete amount of dipping agent for a dipping process of the teat is stored within the dipping agent valve 3a to 3d. For multiple loadings and dippings there is not sufficient time, particularly since the introduced compressed air (for emptying the dipping line) accelerates the reduction of the vacuum that causes the adhering and thus the teat cups fall from the teat immediately.

Figure 5:
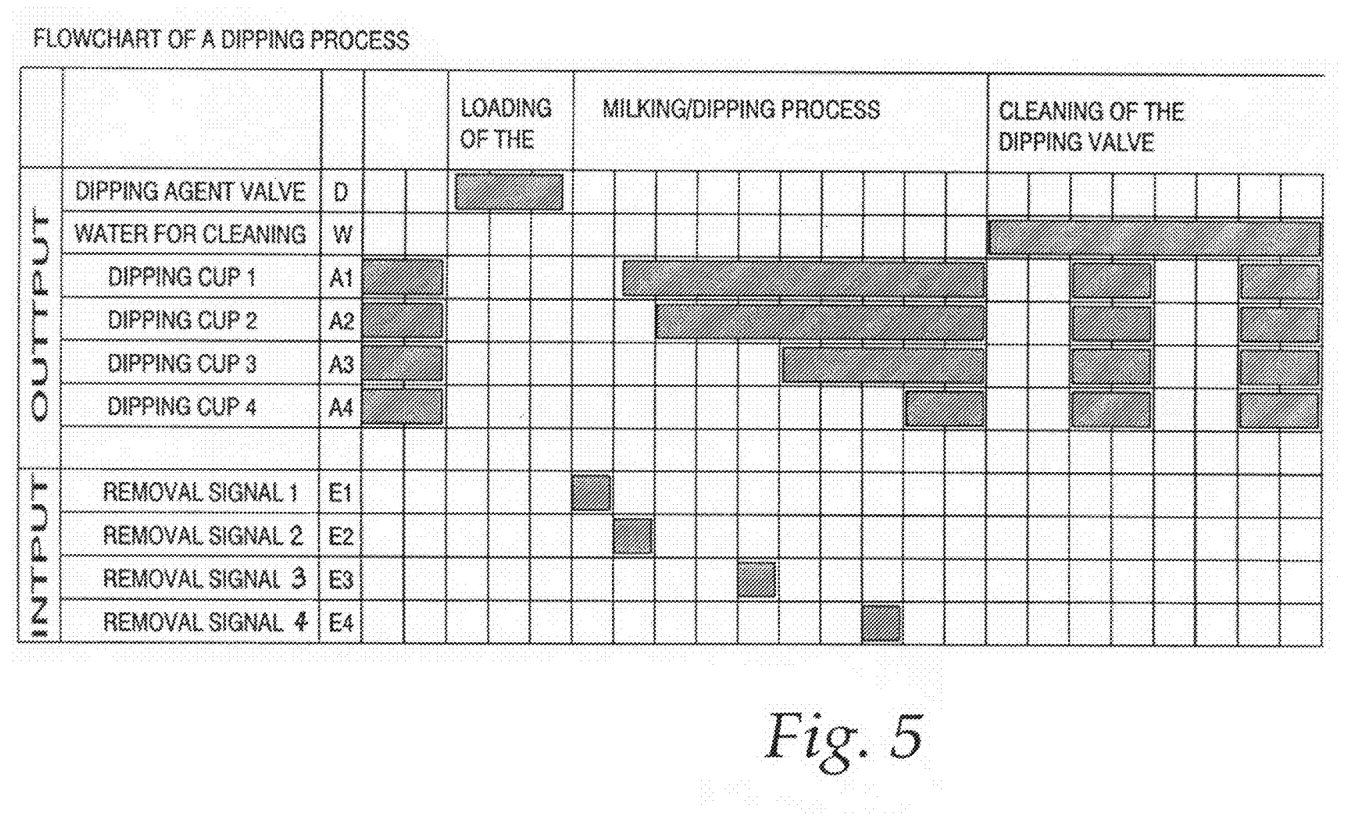
FIG. 5 is an example of a temporal flowchart of a dipping process according to the invention.

FIG. 5 shows further that the actual dipping after the milking process can be introduced delayed in time, while the cleaning of the four dipping valve arrangements after the ending of the actual dipping process can occur simultaneously.

The safety valve arrangement 21 (sometimes referred to herein as a "block-bleed-block device") is sealed on both sides with the aid of valves 26 and 27. The line between valves 26 and 27 is interrupted by a ventilation valve. When compressed air is introduced to the valve arrangement 21 at the control inlet 28, then between the two valves 26 and 27 a connection is made to the line before and after the block-bleed-block device.

In this way, it is ensured that due to the vacuum applied to the teats, during milking, no dipping agent can get into the marketable milk, since the path between the milk channel or the duct 5 in the teat cups, respectively, and the reservoir $D_M$ of the dipping agent is sealed off with two sealed "blocks" (valves 26 and 27, for example).

If a part of a valve or "block" fails, the other valve part or block and the aerated line lying in between ensure that the milked milk is not contaminated. In this way it is ensured safely in a simple manner that the teat liner head is never connected to the dipping agent reservoir $D_V$ during milking.

Cleaning occurs only after successful removal of the complete milking machine from an animal. First, the milking robot separately removes the milking cups and then the milking machine "as a whole" to connect it then to a corresponding milking machine receptacle.

The milking machine receptacle provides an airtight connection of the milking machine to a cleaning or rinsing device so that when a vacuum is applied again to the milk lines of the milking machine, washing fluid is pulled into the milking machine. Thus, the milking system that has come into contact with the dipping agent is cleaned in a secure manner.

In addition, cleaning of the dipping valve arrangement takes place when the milking machine is located in the milking machine receptacle (that is, in the cleaning in place position), the valve W for the supply of water under pressure is opened simultaneously. The valve W remains open during the entire cleaning in place process, and the valve D for the dipping agent remains closed. The double pistons are on the right. The compressed air flowing into the dipping valve arrangement causes the connection in the corresponding block-bleed-block device to be opened in the manner described above.

At the same time, the compressed air finds its way through the bypass line 31 of the corresponding double piston 17, so that a mixture of water under pressure and compressed air clean the, for milking, decisive media lines of the respective dipping valve arrangement in the previously set time intervals in which the four compressed air valves A1 to A4 remain open.

A dipping process of the type of the invention will be explained again below briefly. Preferably, all dipping valve arrangements 3a to 3d are filled or "loaded" simultaneously through the single valve D in line 14 from dipping agent reservoir $D_M$ (see also FIG. 5). This can be done before or during the actual milking process. At the end of the milking process, the compressed air valve A1 to A4 connected in each case before inlet 9 is separately activated for each teat (see again FIG. 5). Hereby, the compressed air pushes the piston of cylinder 17 forward (in FIG. 1 to the right) and opens at the same time the safety valve arrangement 21 at the control inlet 28 (see also FIGS. 3a, b).

When the complete amount of dipping agent is pushed out from cylinder chamber 20, compressed air flows through bypass line 31 into the "dipping line", that is, into lines 30 and the respective line 4a, 4b, 4c or 4d. Any residual dipping agent that may have remained in these lines is thereby passed immediately into the corresponding teat cups 1a to 1d or into the corresponding interiors of the teat liners.

The provided check valves 24 and 25 prevent dipping agent from flowing into the cleaning or bypass lines 15, 31. The check valve 23 prevents repumping of dipping agent into a dipping agent arrangement already activated. This process is performed for each teat after the respective ending of the milking process, which is of special advantage when the removal of the teat cups 1 after milking occurs individually for each teat.

During the cleaning process—which preferably is performed after the ending of all dipping processes for all the teats (see again FIG. 5), the compressed air inlet line is opened by the opening of valves A1 to A4 to open the cylinder 17 pistons. Simultaneously, the cleaning agent is introduced through valve W into the dipping valve arrangements. Then the cleaning agent is guided in the direction of the teat cups and from there it is removed with vacuum. During the cleaning process, the check valve 23 prevents entry of the cleaning agent into the cylinder 17 and prevents its being subsequently contaminated with the dipping agent.

The invention claimed is:

1. A dipping device for automatically applying teat dip to a dairy animal at the end of a milking process through a plurality of milker unit teat cups, each milker unit teat cup having a teat cup liner and each teat cup liner defines a pulsation chamber with the milker unit teat cup, the dipping device comprising:
a plurality of dipping valve arrangements, each dipping valve arrangement
including an outlet connected to a corresponding milker unit teat cup; and wherein each dipping valve arrangement is individually controlled.

2. The dipping device according to claim 1, wherein each dipping valve arrangement is in fluid communication with the chamber of a respective teat cup liner.

3. The dipping device according to claim 1, wherein each dipping valve arrangement includes a safety valve arrangement.

4. The dipping device according to claim 3, wherein each safety valve arrangement includes a pneumatically operated valve.

5. The dipping device according to claim 3, wherein the safety valve arrangement is a 5/2-way valve.

6. The dipping device according to claim 3, wherein the safety valve arrangement is a 3/2-way valve.

7. The dipping device according to claim 1, wherein each dipping valve arrangement includes a control air inlet, a dipping agent inlet, a cleaning fluid inlet, and a common discharge in fluid communication with a corresponding teat cup liner.

8. The dipping device according to claim 1, wherein each of the dipping valve arrangements further comprises:
   a control air inlet; and
   a double action cylinder defining a first cylinder chamber in communication with a dipping agent reservoir, and a second cylinder chamber in communication with the control air inlet.

9. The dipping device according to claim 8, and further comprising:
   a dipping agent reservoir;
   a plurality of branch lines, and each branch line connected a respective dipping agent inlet on each dipping valve arrangement and to the dipping agent reservoir; and
   a plurality of shut-off valves, and each shut-off valve is connected a respective branch line.

10. The dipping device of claim 8, and further comprising a safety valve arrangement connected to the first cylinder chamber of the cylinder.

11. The dipping device according to claim 10, and further comprising:
   a check valve disposed in a line between the first cylinder chamber and the safety valve arrangement.

12. The dipping device according to claim 1, and further comprising:
   a branched compressed air supply line having a plurality of branch lines;
   a control air inlet on each dipping valve arrangement connected to a respective branch line; and
   a plurality of shut-off valves, and each shut-off valve is connected to a respective branch line.

13. The dipping device according to claim 1, and further comprising:
   a teat cup liner inlet line and each teat cup liner inlet line is connected to a dipping solution inlet and a cleaning fluid inlet.

14. The dipping device according to claim 1, wherein each dipping valve arrangement includes a pneumatically operated valve.

15. The dipping device according to claim 1, wherein each dipping valve arrangement is constructed as a single structural unit.

16. A dipping device for automatically applying teat dip to a dairy animal at the end of a milking process through a plurality of milker unit teat cups, each milker unit teat cup having a teat cup liner and each teat cup liner defines a pulsation chamber with the milker unit teat cup, the dipping device comprising:
   a plurality of dipping valve arrangements, each dipping valve arrangement including an outlet connected to a corresponding milker unit teat cup; and wherein each dipping valve arrangement is individually controlled; and
   a plurality of teat cup inlet lines and each teat cup inlet line is joined to a respective dipping valve arrangement.

17. A method for wetting teats of an animal through a plurality of milker unit teat cups with a fluid using a plurality of dipping valve arrangements, the method comprising the step of:
   independently operating each dipping valve arrangement to wet a corresponding teat of an animal with a dipping agent while the teat is disposed in the milker unit teat cup.

18. The method according to claim 17, and further comprising the steps of:
   wetting each teat after the end of a milking process; and
   then operating a milk robot to take off each teat cup individually after the dipping process on a respective animal teat.

19. The method according to claim 17, and further comprising the step of:
   simultaneously filling a cylinder of all of the dipping valve arrangements with dipping agent.

20. The method according to claim 17, and further comprising the step of:
   removing dipping agent from a cylinder chamber in each of the dipping valve arrangements independently of removing dipping agent from other dipping valve arrangements.

21. The method according to claim 17, and further comprising the step of:
   cleaning each dipping device with a cleaning fluid after the end of a dipping process.

22. A method for wetting teats of an animal through a plurality of milker unit teat cups with a fluid using a plurality of dipping valve arrangements, the method comprising the step of:
   independently operating each dipping valve arrangement to wet a corresponding teat of an animal with a dipping agent while the teat is disposed in the milker unit teat cup; and
   controlling the dipping valve arrangements by:
      operating electronically controlled shut off valves, each disposed in a line between a compressed air supply and a respective dipping valve arrangement;
      operating dipping agent control valves, each disposed in a line between a dipping agent reservoir and a respective dipping valve arrangement; and
      operating wash fluid control valves, each disposed in a line between a wash fluid reservoir and a respective dipping valve arrangement.

* * * * *